United States Patent
Xu et al.

(10) Patent No.: US 10,198,299 B1
(45) Date of Patent: Feb. 5, 2019

(54) ENABLING LIVE MIGRATION OF VIRTUAL MACHINES WITH PASSTHROUGH PCI DEVICES

(71) Applicant: VMware, Inc., Palo Alto, CA (US)

(72) Inventors: Xin Xu, San Bruno, CA (US); Bryan Tan, Mountain View, CA (US); Wei Xu, Santa Clara, CA (US); Tao Ren, Santa Clara, CA (US); Radu Rugina, Sunnyvale, CA (US); Vivek Mohan Thampi, Sunnyvale, CA (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 15/798,365

(22) Filed: Oct. 30, 2017

(51) Int. Cl.
*G06F 9/50* (2006.01)
*G06F 13/28* (2006.01)
*G06F 13/16* (2006.01)
*G06F 13/42* (2006.01)
*G06F 9/455* (2018.01)

(52) U.S. Cl.
CPC ........ *G06F 9/5088* (2013.01); *G06F 9/45558* (2013.01); *G06F 13/1673* (2013.01); *G06F 13/28* (2013.01); *G06F 13/4282* (2013.01); *G06F 2009/4557* (2013.01); *G06F 2009/45562* (2013.01); *G06F 2009/45579* (2013.01); *G06F 2213/0026* (2013.01)

(58) Field of Classification Search
CPC .............. G06F 9/45558; G06F 9/5088; G06F 2009/45562
See application file for complete search history.

(56) References Cited

U.S. PATENT DOCUMENTS

2008/0294808 A1* 11/2008 Mahalingam ......... G06F 13/105
710/26

OTHER PUBLICATIONS

Xin Xu et al., "Srvm: Hypervisor support for live migration with sr-iov network devices," in Proceedings of the 12th ACM SIGPLAN/SIGOPS International Conference on Virtual Execution Environments, ser. VEE '16, New York, NY, USA, 2016, pp. 65-77.
"Microsoft Hyper-V," http://www.microsoft.com/en-us/server-cloud/solutions/virtualization.aspx, [Online; accessed Aug. 20, 2015].
Zhenhao Pan et al., "Compsc: Live migration with pass-through devices," in Proceedings of the 8th ACM SIGPLAN/SIGOPS Conference on Virtual Execution Environments, ser. VEE '12. New York, NY, USA: ACM, 2012, pp. 109-120.
(Continued)

*Primary Examiner* — Farley Abad

(57) ABSTRACT

Techniques for enabling live migration of VMs with passthrough PCI devices are provided. In one set of embodiments, a hypervisor of a host system can create a copy of a DMA buffer used by a VM of the host system and a passthrough PCI device of the VM. The hypervisor can further designate one of the DMA buffer or the copy of the DMA buffer as a vCPU buffer that is accessible by the VM, and designate the other of the DMA buffer or the copy of the DMA buffer as a device buffer that is accessible by the passthrough PCI device. The hypervisor can then synchronize the vCPU buffer and the device buffer with each other as the VM and passthrough PCI device interact with their respective buffers, and as part of the synchronization can intercept DMA work requests submitted by the VM/completed by the passthrough PCI device.

21 Claims, 3 Drawing Sheets

(56) References Cited

OTHER PUBLICATIONS

"Xen PCI Passthrough," https://wiki.xen.org/wiki/Xen PCI Passthrough, [Accessed on Mar 29 2017], 12 pages.
Edwin Zhai et al, "Live Migration with Pass-through Device for Linux VM", OLS08: The 2008 Ottawa Linux Symposium, 2008, 9 pages.
Thomas Davis, "Linux Ethernet Bonding Driver Howto", www.kernel.org, Apr. 27, 2011, 46 pages.
"Data Plane Development Kit," http://dpdk.org, [Accessed on Nov. 17, 2015], 2 pages.
James Gleeson et al., "Technical report: Crane—Fast and Migratable GPU Passthrough for OpenCL applications", University of Toronto, Toronto, Canada, 12 page, downloaded Sep. 12, 2018 from //www.cs.toronto.edu/~jgleeson/publications/crane_tech_report.pdf.

\* cited by examiner

ENABLING LIVE MIGRATION OF VIRTUAL MACHINES WITH PASSTHROUGH PCI DEVICES

BACKGROUND

Peripheral Component Interconnect (PCI) passthrough is a technology that allows a virtual machine (VM) to directly access a physical PCI device (e.g., network interface card (NIC), graphics card, storage device, hardware accelerator, etc.) without hypervisor intervention. This is in contrast to traditional hypervisor-based device emulation, which requires the hypervisor to emulate the physical PCI device using a virtual device and mediate communication between the VM and the physical PCI device via the virtual device. By removing the hypervisor as an intermediary, PCI passthrough reduces the latency of VM-to-physical device communications and eliminates the CPU overhead incurred for device emulation. This, in turn, substantially improves the performance of VM operations that require interaction with the physical PCI device, such as network Input/Output (I/O), storage I/O, graphics rendering, and so on.

Due to its performance benefits, PCI passthrough is becoming an increasingly important and common feature in virtualized deployments. However, a significant limitation of PCI passthrough is that it is incompatible with live VM migration (referred to herein as simply "live migration"), which is a virtualization feature that allows a running VM to be moved from one host system to another without power-cycling the VM. There are existing mechanisms that attempt to address this incompatibility, but these mechanisms suffer from various shortcomings, such as the need for guest software modifications and/or inability to be applied to a wide range of PCI devices, that limit their scalability and usefulness.

SUMMARY

Techniques for enabling live migration of VMs with passthrough PCI devices are provided. In one set of embodiments, a hypervisor of a host system can create a copy of a direct memory access (DMA) buffer used by a VM of the host system and a passthrough PCI device of the VM. The hypervisor can further designate one of the DMA buffer or the copy of the DMA buffer as a vCPU buffer that is accessible by the VM, and designate the other of the DMA buffer or the copy of the DMA buffer as a device buffer that is accessible by the passthrough PCI device. The hypervisor can then synchronize the vCPU buffer and the device buffer with each other as the VM and passthrough PCI device interact with their respective buffers, and as part of the synchronization can intercept DMA work requests submitted by the VM/completed by the passthrough PCI device.

The following detailed description and accompanying drawings provide a better understanding of the nature and advantages of particular embodiments.

DETAILED DESCRIPTION

Figure 1:
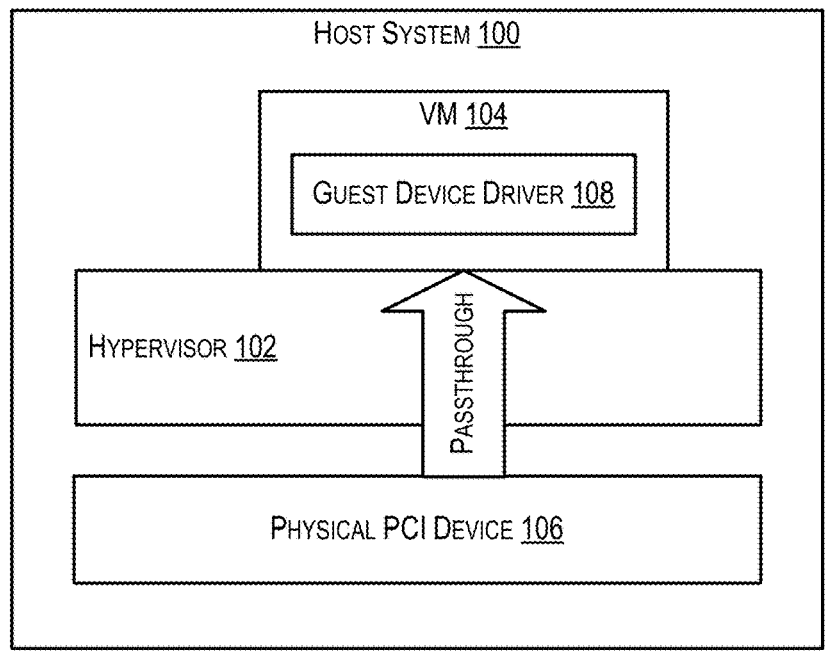
FIG. 1 depicts an example host system comprising a VM with a passthrough PCI device.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques that enable a VM with a passthrough PCI device (i.e., a physical PCI device that has been directly assigned to the VM via PCI passthrough) to be live migrated. There are two main challenges in supporting live migration for such a VM: (1) tracking the VM memory pages that are modified (i.e., dirtied) by the passthrough PCI device via direct memory access (DMA) during the migration pre-copy phase, and (2) handling the movement of device-specific state (i.e., state that is maintained within device-specific hardware registers of the device) from the source host system to the destination host system during the migration switch-over phase.

To address (1), a double buffering technique is provided that remaps a single DMA ring buffer used by the VM and passthrough PCI device into two separate DMA ring buffers. Through this remapping, the VM's hypervisor can intercept DMA work requests that are completed by the passthrough PCI device and thereby identify which VM memory pages are dirtied via the DMA. Unlike prior art approaches to VM dirty memory tracking, this double buffering technique does not require any modifications to the VM's guest software and guarantees data correctness.

To address (2), a generic callback framework is provided which comprises (a) callback function definitions pertaining to device-specific state management that are defined by the hypervisor, and (b) implementations of those callback functions that are defined by PCI device vendors and included in each PCI device's host device driver. With this framework, the hypervisor does not need to have detailed knowledge of a passthrough PCI device's specification in order to migrate the device's device-specific state during the switch-over phase; instead, the hypervisor need only invoke the appropriate callback functions implemented by the device vendor. This allows the hypervisor to interact with a wide variety of passthrough PCI devices for live migration in a generic manner.

The foregoing and other aspects of the present disclosure are discussed in further detail in the sections that follow. It should be noted that, while the present disclosure focuses on enabling live migration in particular with PCI passthrough for purposes of explanation, the embodiments described herein may also be used for enabling other virtualization features with PCI passthrough that face the same or similar compatibility challenges as live migration (i.e., tracking of VM memory pages dirtied via passthrough DMA and handling of passthrough device-specific state). Accordingly, the present disclosure should be broadly construed as encompassing all such use cases.

2. Example Host System and High-Level Design

FIG. 1 is a simplified block diagram of a host system 100 in which embodiments of the present disclosure may be implemented. As shown, host system 100 includes a virtualization software layer (i.e., hypervisor) 102 that provides an environment in which one or more VMs, such as VM 104, can run. Host system 100 also includes a physical PCI device 106, which may be a NIC, a storage device (e.g., magnetic or flash-based hard disk), a hardware accelerator, or any other type of peripheral device known in the art. In the example of FIG. 1, device 106 is passed through to VM 104 using PCI passthrough (and thus is considered a "passthrough PCI device" of VM 104). This means that VM 104 can directly access, through a guest device driver 108, the device-specific state of physical PCI device 106 without hypervisor involvement (typically achieved by exposing the hardware registers of device 106 to driver 108 via memory-mapped I/O). In addition, VM 104 can directly submit, through guest device driver 108, DMA work requests to device 106 (e.g., I/O requests, compute requests, etc.), and in response device 106 can execute the DMA work requests by writing the results of the work directly into the guest memory of VM 104 via DMA.

Figure 2:
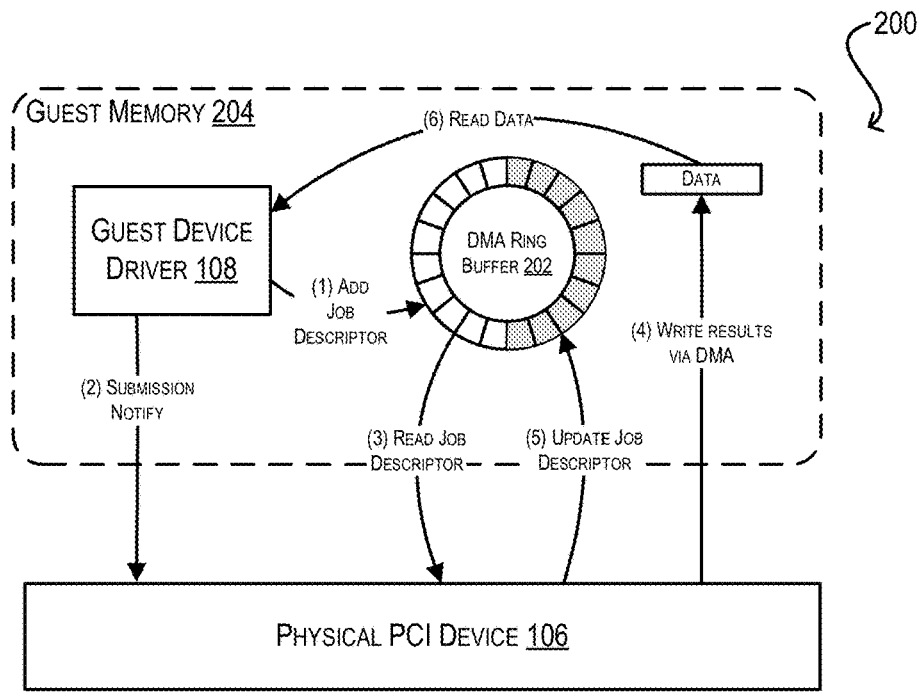
FIG. 2 depicts an example DMA work request processing workflow.

FIG. 2 is a schematic diagram 200 that illustrates how guest device driver 108 and physical PCI device 106 typically interact with each other for DMA work request processing. At step (1) of diagram 200, guest device driver 108 submits a DMA work request by placing a job descriptor for the request into a DMA ring buffer 202 residing in VM guest memory 204. This DMA ring buffer is accessible by physical PCI device 106 through a hardware-based translation layer (e.g., IOMMU unit) that translates device-visible guest memory addresses into host memory addresses. The job descriptor added by guest device driver 108 includes DMA information pertaining to the work request, such as the DMA address to be written and the DMA data size.

At step (2), guest device driver 108 notifies physical PCI device 106 that the work request has been submitted. This notification is usually accomplished by updating a particular memory-mapped register of device 106 with the value of a buffer tail pointer pointing to the newly-added job descriptor.

At steps (3) and (4), physical PCI device 106 reads the job descriptor from DMA ring buffer 202, executes the DMA work request, and writes the results via DMA to the VM guest memory address specified in the original job descriptor. In addition, at step (5), physical PCI device 106 updates DMA ring buffer 202 to reflect completion of the DMA work request. Device 106 can perform step (5) by either updating the original job descriptor added by guest device driver 108 with a "completed" status (and potentially overwriting the DMA information in the job descriptor), or by adding a new job descriptor with this completed status to DMA ring buffer 202. In some cases, physical PCI device 106 may also send a notification to guest device driver 108 at this point to signal work completion by, e.g., updating a memory-mapped device register or raising an interrupt (not shown).

Finally, at step (6), guest device driver 108 reads the work completion status from DMA ring buffer 202, which allows VM 104 to use the data written by physical PCI device 106 and continue with its runtime operation.

As noted the Background section, a significant drawback of passing through a physical PCI device to a VM as shown in FIG. 1 is that the VM cannot be live migrated. To understand this incompatibility, consider the typical workflow for a live migration event. During a long first phase (known as the pre-copy phase), the hypervisor on the source host system copies, from the source host system to the destination host system, memory pages of the VM to be migrated while the VM is running. Since the VM is active during this phase, the hypervisor keeps track of the memory pages that are dirtied by the VM as it runs and copies these pages over to the destination host system in an iterative manner. Then, during a short, second phase (known as as the switch-over phase), the VM on the source host system is temporarily stopped (i.e., quiesced), the VM's CPU and device-specific state is saved and copied over to the destination host system, and the VM is resumed on the destination host system.

There are two main problems that PCI passthrough introduces in the live migration workflow above. First, with PCI passthrough, the VM is not the only entity that can write data into VM guest memory; the passthrough PCI device can also write data into VM guest memory via DMA as shown in FIG. 2. The hypervisor cannot track these DMA writes because the hypervisor is generally unaware that they are occurring. As a result, the VM memory pages that are modified by the passthrough PCI device via DMA cannot be identified by the hypervisor as dirty during the pre-copy phase and thus cannot be propagated to the destination host system, thereby breaking the migration process.

Second, since the device-specific state of a passthrough PCI device is not virtualized in the hypervisor (rather, it is exposed directly to the VM), the hypervisor does not have a reliable mechanism to save this device-specific state on the source host system or to restore it on the destination host system at the time of switch-over. Similarly, the hypervisor does not have a reliable mechanism to quiesce the passthrough PCI device at the time of quiescing the VM, which is needed in order to ensure consistency of the device-specific state (as well as VM memory state) that is copied to the destination host system.

For the first problem (dirty memory tracking), one known solution is to modify the passthrough PCI device's guest device driver in a manner that causes the driver to notify the hypervisor each time VM memory is dirtied via passthrough DMA, or disable passthrough mode entirely when live migration is initiated. Unfortunately, this solution is not scalable since it must be implemented in the driver of every potential passthrough PCI device that needs live migration interoperability. Another known solution is for the hypervisor to trap all VM accesses to the single DMA ring buffer shared by the VM and the passthrough PCI device and thereby inspect the DMA work requests that are submitted/completed. But, as explained in further detail below, there is an inherent race condition with this mechanism that can result in incorrect DMA tracking.

For the second problem (handling device-specific state migration), it is possible for the hypervisor to implement custom logic for saving and restoring the device-specific state of select passthrough PCI devices, assuming the hypervisor has access to the specifications for those devices. However, this solution significantly increases the engineering effort on the hypervisor side and, from a practical perspective, cannot realistically cover the entire universe of PCI devices that may be used in passthrough mode.

Figure 3:
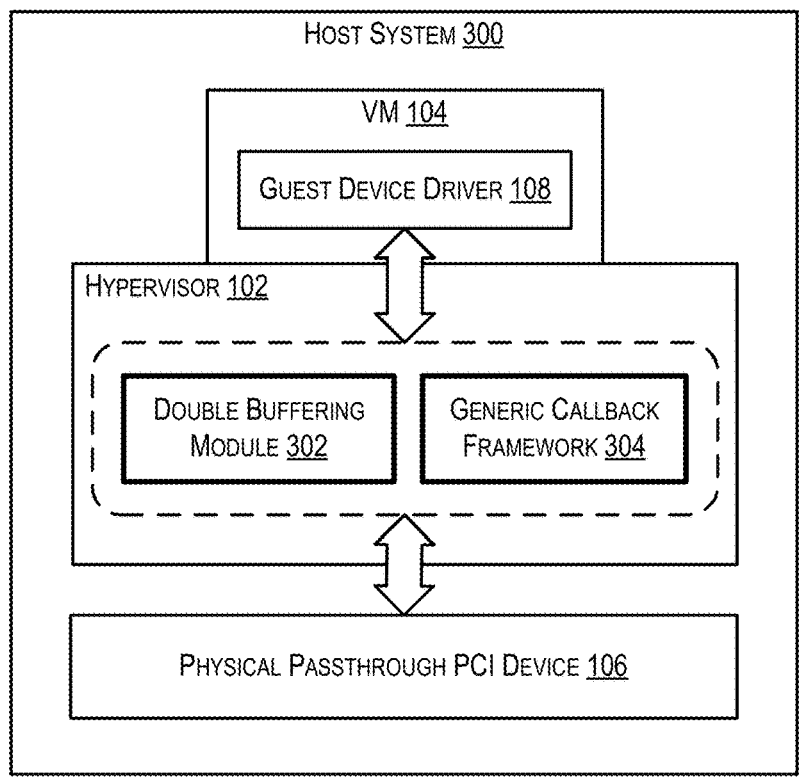
FIG. 3 depicts an enhanced host system that supports live migration with PCI passthrough according to an embodiment.
Figure 4:
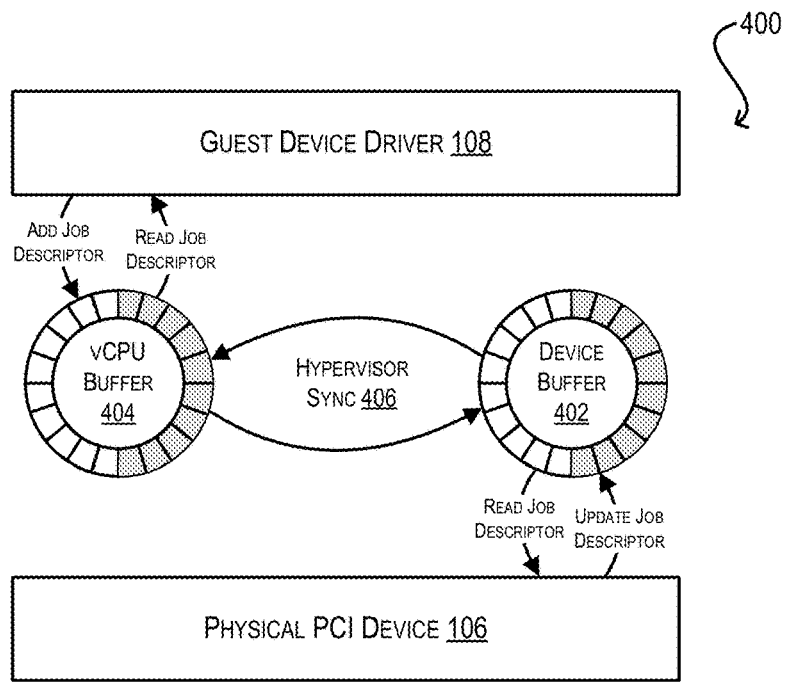
FIG. 4 is a schematic diagram of DMA ring double buffering according to an embodiment.

To address the foregoing problems and deficiencies, FIG. 3 depicts an enhanced version of host system 100 (i.e., system 300) that includes two novel components within hypervisor 102—a double buffering module 302 and a generic callback framework 304. At a high level, double buffering module 302 can remap the single DMA ring buffer 202 that is accessed by guest device driver 108 of VM 104 and physical PCI device 106 in the conventional DMA workflow of FIG. 2 into two separate DMA ring buffers at the time VM 104 is live migrated: a first buffer that is accessed solely by device 106 (referred to as the "device buffer"), and a second buffer that is accessed solely by guest device driver 108/VM 104 (referred to as the "vCPU buffer"). Double buffering module 302 can then synchronize these two buffers such that the writes made to one buffer are reflected in the other buffer, and as part of this synchronization can intercept the details of each DMA work request completed by physical PCI device 106. This process is shown schematically in diagram 400 of FIG. 4, which depicts device buffer 402, vCPU buffer 404, and synchronization step 406 performed by module 302. With this general approach, double buffering module 302 can enable hypervisor 102 to track the VM memory that is dirtied via passthrough DMA during the migration pre-copy phase in a manner that (1) does not require any modifications to the guest software of VM 104, and (2) ensures no DMA information is lost. In various embodiments, the double buffering performed via double buffering module 302 will only be active for VM 104 and passthrough PCI device 106 while the VM is in the process of being live migrated; if the VM is not being live migrated, the VM and passthrough PCI device will interoperate in traditional passthrough mode. This avoids the performance impact of double buffering when it is not needed.

Further, generic callback framework 304 (which comprises callback function definitions defined by hypervisor 102 and corresponding callback function implementations implemented by device vendors within respective host device drivers) can provide hypervisor 102 with a common interface for handling device-specific state migration in a generic fashion. For example, when the live migration of VM 104 reaches the switch-over phase, hypervisor 102 can leverage framework 304 and invoke the callback functions implemented by the vendor of physical PCI device 106 in order to properly quiesce, save, and restore the device-specific state of device 106. By offloading the implementation of device-specific state management to device vendors, generic callback framework 104 avoids the need for hypervisor 102 to implement custom state handling logic for every possible passthrough PCI device. This, in turn, significantly reduces the engineering effort on the hypervisor side and allows this solution to easily scale and cover a wide range of PCI devices.

Additional details regarding the implementation of double buffering module 302 and generic callback framework 304 are provided in sections (3) and (4) respectively below.

It should be appreciated that FIGS. 1-4 are illustrative and not intended to limit embodiments of the present disclosure. For example, the various entities shown in these figures may be organized according to different arrangements/configurations or may include subcomponents or functions that are not specifically described. One of ordinary skill in the art will recognize other variations, modifications, and alternatives.

3. Double Buffering

Figure 5:
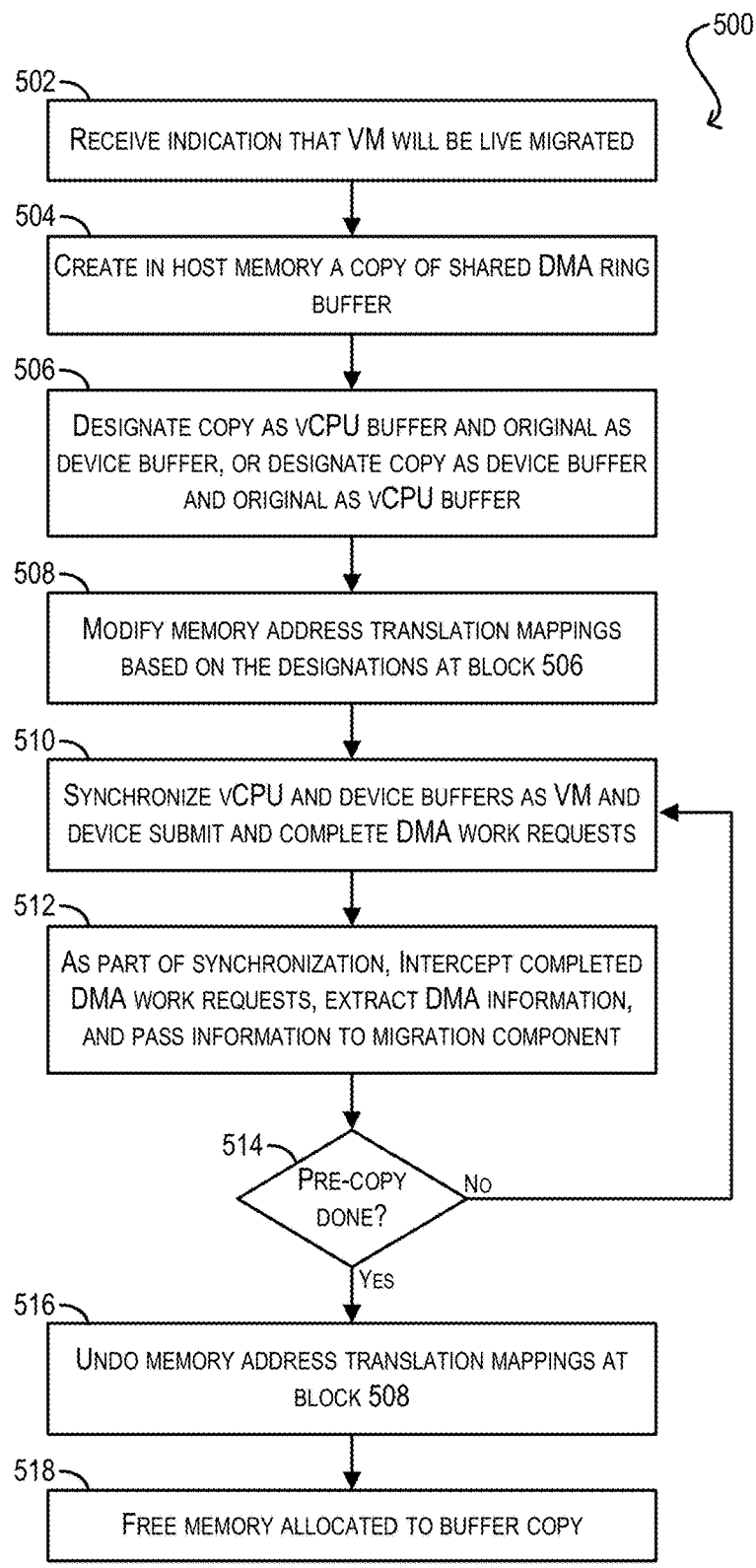
FIG. 5 depicts a double buffering workflow according to an embodiment.

FIG. 5 depicts a workflow 500 that can be executed by hypervisor 102 (via double buffering module 302) for implementing double buffering with respect to VM 104 and physical PCI device 106 according to an embodiment. As mentioned previously and as illustrated in FIG. 4, this double buffering technique remaps single DMA ring buffer 202 that is traditionally shared by VM 104 and physical PCI device 106 in passthrough mode (per FIG. 2) into two separate DMA ring buffers: a device buffer 402 for device 106 and a vCPU buffer 404 for VM 104. By creating and synchronizing these two buffers, hypervisor 102 can intercept all DMA work requests that are completed by device 106 and thereby accurately track the memory of VM 104 that is dirtied via passthrough DMA.

Prior to discussing workflow 500, to clarify the need for two separate DMA ring buffers, consider a single buffer implementation where hypervisor 102 simply traps all accesses by VM 104 to DMA ring buffer 202 in order to inspect submitted and completed DMA work requests (briefly noted in section (2) above). With this single buffer implementation, hypervisor 102 can only inspect the DMA information (e.g., address and size) for a particular DMA work request after a job descriptor for that work request has been added to DMA ring buffer 202. But, once the job descriptor is added, physical PCI device 106 may immediately process the work request, execute the DMA, and update the job descriptor in DMA ring buffer 202 with a "completed" status. Further, as discussed with respect to FIG. 2, in some cases physical PCI device 106 may overwrite the DMA information in the job descriptor as part of updating the descriptor's status. Taken together, these factors mean that the DMA information for the work request can potentially be lost (by being overwritten by device 106) before hypervisor 102 has a chance to read it. The use of two separate DMA ring buffers—each of which can only be updated by VM 104 or physical PCI device 106 respectively—avoids this race condition by preventing VM 104 and device 106 from writing to the same job descriptor in the same buffer. This, in turn, ensures that hypervisor 102 will be able to inspect the DMA information of every DMA work request.

Turning now to workflow 500, starting with block 502, hypervisor 102 can receive an indication that VM 104 will be live migrated. Hypervisor 102 may receive this indication from a cluster management agent or some other entity that is responsible for orchestrating the live migration process.

In response, hypervisor 102 can create, in host main memory, a copy of original DMA ring buffer 202 shared by VM 104 and physical (i.e., passthrough) PCI device 106 (block 504), designate the newly-created copy as either the vCPU buffer or the device buffer (block 506), and based on this designation, modify certain guest physical page number (GPPN) to host physical page number (HPPN) mappings such that either VM 104 or device 106 is redirected to the newly-created copy (block 508). For example, if the newly-created copy is designated as the vCPU buffer (i.e., will be used by VM 104), hypervisor 102 can modify its Extended Page Tables (EPT) in a manner that causes VM 104 to access the copy instead of original DMA ring buffer 202. In this case, physical PCI device 106 will continue to access original buffer 202 as before and this original buffer will be the device buffer.

Alternatively, if the newly-created copy is designated as the device buffer (i.e., will be used by physical PCI device 106), hypervisor 102 can reprogram the host's IOMMU unit in a manner that causes device 106 to access the copy instead of original DMA ring buffer 202. In this case, VM 104 will continue to access original buffer 202 as before and this original buffer will be the vCPU buffer. Note that, due to the remapping performed at block 508, VM 104 and physical PCI device 106 are unaware that two separate physical buffers exist; from their perspective, there is still only one DMA ring buffer as in the standard DMA workflow of FIG. 2. One of these two entities is simply redirected to access the newly-created buffer copy.

Once the remapping is completed and the device and vCPU buffers are in place, hypervisor 102 can synchronize the two buffers as VM 104 and device 106 submit/complete DMA work requests (block 510). For instance, after VM 104 has added a job descriptor for a DMA work request to the vCPU buffer, hypervisor 102 can copy the new job descriptor to the device buffer so that it can be read by physical PCI device 106. Similarly, after device 106 has written or updated a job descriptor with a completed status to the device buffer, hypervisor 102 can copy the new/updated job descriptor to the vCPU buffer so that it can be read by VM 104. The main goal of this synchronization is to ensure that the order of DMA work request submissions/completions and the notifications related to them, as seen by VM 104, is exactly the same as in the conventional single buffer case.

Further, as part of the synchronization process at block 510, hypervisor can intercept DMA work requests that have been completed by physical PCI device 106, extract the DMA information related to those completed requests (which may involve accessing the job descriptors for the corresponding request submissions), and provide this information to a migration component of hypervisor 102 that is responsible for carrying out the migration pre-copy phase (block 512). In this way, hypervisor 102 can ensure that the migration component is able to track the VM memory pages that are dirtied via the completed DMA and copy those dirty memory pages over to the destination host system.

It should be noted that there are a couple of approaches for implementing the synchronization described above. According to one approach, hypervisor 102 can trap every VM read and write of the vCPU buffer. Upon trapping a write, hypervisor 102 can copy any updates in the vCPU buffer to the device buffer. Conversely, upon trapping a read, hypervisor 102 can copy any updates in the device buffer to the vCPU buffer. Because hypervisor 102 performs this copying at the time of each VM access, this approach guarantees that the order of work request submissions/completions and their corresponding notifications will remain unchanged from the perspective of the VM and thus can guarantee DMA correctness. However, this approach also incurs a fairly high performance overhead, since every VM access to the vCPU buffer requires a VM exit (i.e., context switch).

An alternative, more optimized approach is for hypervisor 102 to only intercept the work request submission/completion notifications generated by VM 104 and physical PCI device 106. Hypervisor 102 can then synchronize the device and vCPU buffers in response to these notifications. As mentioned with respect to FIG. 2, in the case of work request submissions, VM 104 will typically notify device 106 by updating a particular memory-mapped device register. Thus, for these submissions, hypervisor 102 can trap MMIO write accesses by VM 104 and synchronize the buffers if that particular device register is written.

In the case of work request completions, device 106 can notify VM 104 by either (1) raising a device interrupt, or (2) updating a particular memory-mapped device register that is subsequently read by VM 104. For (1), hypervisor 102 can intercept the device interrupt, perform the synchronization, and then send a virtual interrupt to VM 104. For (2), hypervisor 102 can trap MMIO read accesses by VM 104 and synchronize the buffers if that particular device register is read. It is also possible that device 106 does not provide any notification to VM 104 upon completing a DMA work request, and VM 104 simply polls the DMA ring buffer to identify work completions. However, in this case there are no correctness issues to be addressed via synchronization; hypervisor 102 can simply poll the device buffer on a periodic basis for work request completions and copy those completions over to the vCPU buffer.

Returning to workflow 500, at block 514, hypervisor 102 can check whether the migration pre-copy phase has ended yet. If not, hypervisor 102 can iterate blocks 510 and 512.

However, if hypervisor 102 determines that the pre-copy phase has ended at block 514, hypervisor 102 can undo the address remapping performed at block 508 such that VM 104 and physical PCI device 106 are both able to access original DMA ring buffer 202 again and operate in conventional passthrough mode (block 516). Finally, at block 518, hypervisor 102 can free the memory allocated to the buffer copy and workflow 500 can end.

4. Generic Callback Framework

As mentioned previously, generic callback framework 304 of FIG. 3 can include (1) a set of callback function definitions that are defined by hypervisor 102 and that pertain to the management of device-specific state, and (2) implementations of those callback functions that are provided by PCI device vendors (typically within host device drivers). Hypervisor 102 can invoke these callback functions during the live migration process to delegate device-specific state handling to the host device drivers, thereby avoiding the need to implement custom logic for carrying out these functions. The following table lists an example set of callback function definitions that may be included in framework 304 according to an embodiment:

TABLE 1

| Callback | Description |
| --- | --- |
| Quiesce(void) | Quiesce device |
| Save(void *blob, int *size) | Save device registers |
| Restore(void *blob, int size) | Restore device registers |
| struct RingInfo GetRingInfo(int ringID) | Query ring information (e.g., type, ID, base register, etc.) |
| struct JobInfo GetJobInfo(int ringID, int jobID) | Query DMA information (e.g., address, size, status) |

The first three callbacks in the table above can be used by hypervisor 102 during the migration switch-over phase. For example, hypervisor 102 can invoke the Quiesce( ) callback to quiesce the passthrough PCI device of a VM at the time of stopping the VM. This prevents the device from issuing any further DMA and thus allows hypervisor 102 to safely save the VM's device-specific state and remaining memory state for migration to the destination host system. In addition, hypervisor 102 can invoke the Save( ) callback to get a blob of the device's state (which can subsequently be copied to the destination host system), and can invoke the Restore( ) callback to restore the state of a device that was saved on another host system and is being migrated to the current host system.

The last two callbacks in Table 1 do not specifically relate to device state management, but can be used by hypervisor 102 to facilitate the double buffering workflow of FIG. 5. In particular, hypervisor 102 can invoke the GetRingInfo( ) callback to query information regarding the DMA ring buffer that is used by a VM and its passthrough PCI device, and can use this information to create an exact copy of the buffer (per block 504 of FIG. 5). Further, hypervisor 102 can invoke the GetJobInfo( ) callback at the time it intercepts a DMA work request completion (per block 512 of FIG. 5) in order to obtain the DMA address and size associated with that work request.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:
1. A method comprising:
   creating, by a hypervisor of a host system, a copy of a direct memory access (DMA) buffer used by a virtual machine (VM) of the host system and a passthrough Peripheral Component Interconnect (PCI) device of the VM;

designating, by the hypervisor, one of the DMA buffer or the copy of the DMA buffer as a vCPU buffer that is accessible by the VM;

designating, by the hypervisor, the other one of the DMA buffer or the copy of the DMA buffer as a device buffer that is accessible by the passthrough PCI device;

synchronizing, by the hypervisor, the vCPU buffer and the device buffer with each other as the VM interacts with the vCPU buffer and as the passthrough PCI device interacts with the device buffer; and as part of the synchronizing, intercepting, by the hypervisor, DMA work requests submitted by the VM and completed by the passthrough PCI device.

2. The method of claim 1 wherein if the copy of the DMA buffer is designated as the vCPU buffer, the designating comprises modifying memory address mappings in one or more Extended Page Tables (EPT) maintained by the hypervisor so that the VM is redirected to the copy, and wherein if the copy of the DMA buffer is designated as the device buffer, the designating comprises modifying memory address mappings in a IOMMU unit of the host system so that the passthrough PCI device is directed to the copy.

3. The method of claim 1 wherein the synchronizing comprises:

trapping VM accesses to the vCPU buffer; and synchronizing the vCPU buffer and the device buffer in response to the VM accesses.

4. The method of claim 1 wherein the synchronizing comprises:

trapping notifications regarding DMA work request submissions and DMA work request completions; and synchronizing the vCPU buffer and the device buffer in response to the notifications.

5. The method of claim 1 wherein the creating is performed in response to determining that the VM will be live migrated from the host system to another host system, and wherein the method further comprises:

extracting DMA information from the intercepted DMA work requests; and passing the DMA information to a component of the hypervisor responsible for carrying out the live migration.

6. The method of claim 1 further comprising:

implementing a generic callback framework that includes:

definitions of callback functions pertaining to device-specific state management that are defined by the hypervisor; and implementations of the callback functions that are implemented by a device vendor of the passthrough PCI device in a host device driver.

7. The method of claim 6 wherein the callback function definitions include a quiesce function for quiescing the passthrough PCI device, a save function for saving device-specific state of the passthrough PCI device, and a restore function for restoring the device-specific state saved via the save function.

8. A non-transitory computer readable storage medium having stored thereon program code executable by a hypervisor of a host system, the program code embodying a method comprising:

creating a copy of a direct memory access (DMA) buffer used by a virtual machine (VM) of the host system and a passthrough Peripheral Component Interconnect (PCI) device of the VM;

designating one of the DMA buffer or the copy of the DMA buffer as a vCPU buffer that is accessible by the VM;

designating the other one of the DMA buffer or the copy of the DMA buffer as a device buffer that is accessible by the passthrough PCI device;

synchronizing the vCPU buffer and the device buffer with each other as the VM interacts with the vCPU buffer and as the passthrough PCI device interacts with the device buffer; and as part of the synchronizing, intercepting DMA work requests submitted by the VM and completed by the passthrough PCI device.

9. The non-transitory computer readable storage medium of claim 8 wherein if the copy of the DMA buffer is designated as the vCPU buffer, the designating comprises modifying memory address mappings in one or more Extended Page Tables (EPT) maintained by the hypervisor so that the VM is redirected to the copy, and wherein if the copy of the DMA buffer is designated as the device buffer, the designating comprises modifying memory address mappings in a IOMMU unit of the host system so that the passthrough PCI device is directed to the copy.

10. The non-transitory computer readable storage medium of claim 8 wherein the synchronizing comprises:

trapping VM accesses to the vCPU buffer; and synchronizing the vCPU buffer and the device buffer in response to the VM accesses.

11. The non-transitory computer readable storage medium of claim 8 wherein the synchronizing comprises:

trapping notifications regarding DMA work request submissions and DMA work request completions; and synchronizing the vCPU buffer and the device buffer in response to the notifications.

12. The non-transitory computer readable storage medium of claim 8 wherein the creating is performed in response to determining that the VM will be live migrated from the host system to another host system, and wherein the method further comprises:

extracting DMA information from the intercepted DMA work requests; and passing the DMA information to a component of the hypervisor responsible for carrying out the live migration.

13. The non-transitory computer readable storage medium of claim 8 wherein the method further comprises:

implementing a generic callback framework that includes:

definitions of callback functions pertaining to device-specific state management that are defined by the hypervisor; and implementations of the callback functions that are implemented by a device vendor of the passthrough PCI device in a host device driver.

14. The non-transitory computer readable storage medium of claim 13 wherein the callback function definitions include a quiesce function for quiescing the passthrough PCI device, a save function for saving device-specific state of the passthrough PCI device, and a restore function for restoring the device-specific state saved via the save function.

15. A host system comprising:

a hypervisor running a virtual machine (VM);

a physical Peripheral Component Interconnect (PCI) device acting as a passthrough PCI device of the VM;

a processor; and a non-transitory computer readable medium having stored thereon program code that, when executed by the processor, causes the processor to:
- create a copy of a direct memory access (DMA) buffer used by the VM and the passthrough PCI device;
- designate one of the DMA buffer or the copy of the DMA buffer as a vCPU buffer that is accessible by the VM;
- designate the other one of the DMA buffer or the copy of the DMA buffer as a device buffer that is accessible by the passthrough PCI device;
- synchronize the vCPU buffer and the device buffer with each other as the VM interacts with the vCPU buffer and as the passthrough PCI device interacts with the device buffer; and
- as part of the synchronizing, intercept DMA work requests submitted by the VM and completed by the passthrough PCI device.

16. The host system of claim 15 wherein if the copy of the DMA buffer is designated as the vCPU buffer, the designating comprises modifying memory address mappings in one or more Extended Page Tables (EPT) maintained by the hypervisor so that the VM is redirected to the copy, and
wherein if the copy of the DMA buffer is designated as the device buffer, the designating comprises modifying memory address mappings in a IOMMU unit of the host system so that the passthrough PCI device is directed to the copy.

17. The host system of claim 15 wherein the program code that causes the processor to synchronize the vCPU buffer and the device buffer comprises program code that causes the processor to:
- trap VM accesses to the vCPU buffer; and
- synchronize the vCPU buffer and the device buffer in response to the VM accesses.

18. The host system of claim 15 wherein the program code that causes the processor to synchronize the vCPU buffer and the device buffer comprises program code that causes the processor to:
- trap notifications regarding DMA work request submissions and DMA work request completions; and
- synchronize the vCPU buffer and the device buffer in response to the notifications.

19. The host system of claim 15 wherein the creating is performed in response to determining that the VM will be live migrated from the host system to another host system, and wherein the program code further causes the processor to:
- extract DMA information from the intercepted DMA work requests; and
- pass the DMA information to a component of the hypervisor responsible for carrying out the live migration.

20. The host system of claim 15 wherein the program code further causes the processor to:
- implement a generic callback framework that includes:
  - definitions of callback functions pertaining to device-specific state management that are defined by the hypervisor; and
  - implementations of the callback functions that are implemented by a device vendor of the passthrough PCI device in a host device driver.

21. The host system of claim 20 wherein the callback function definitions include a quiesce function for quiescing the passthrough PCI device, a save function for saving device-specific state of the passthrough PCI device, and a restore function for restoring the device-specific state saved via the save function.

* * * * *